(12) United States Patent
Meo et al.

(10) Patent No.: US 11,181,692 B2
(45) Date of Patent: Nov. 23, 2021

(54) REINFORCING APPARATUS FOR OPTICAL FIBER FUSION-SPLICING PART AND FUSION SPLICER PROVIDED WITH THE SAME

(71) Applicant: SEI OPTIFRONTIER CO., LTD., Yokohama (JP)

(72) Inventors: Ryosuke Meo, Chigasaki (JP); Ryuichiro Sato, Chigasaki (JP); Hiroshi Takayanagi, Chigasaki (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 473 days.

(21) Appl. No.: 16/302,165

(22) PCT Filed: May 16, 2017

(86) PCT No.: PCT/JP2017/018379
§ 371 (c)(1),
(2) Date: Nov. 16, 2018

(87) PCT Pub. No.: WO2017/199960
PCT Pub. Date: Nov. 23, 2017

(65) Prior Publication Data
US 2019/0196105 A1   Jun. 27, 2019

(30) Foreign Application Priority Data

May 19, 2016   (JP) .............................. JP2016-100437

(51) Int. Cl.
*G02B 6/255*   (2006.01)
(52) U.S. Cl.
CPC ........... *G02B 6/2553* (2013.01); *G02B 6/255* (2013.01); *G02B 6/2558* (2013.01)

(58) Field of Classification Search
CPC ..... G02B 6/2553; G02B 6/255; G02B 6/2558
(Continued)

(56) References Cited

U.S. PATENT DOCUMENTS

| 5,222,171 A | * | 6/1993 | Straus | ................. G02B 6/2551 |
| | | | | 385/96 |
| 5,533,160 A | * | 7/1996 | Watanabe | ............ G02B 6/2551 |
| | | | | 219/121.45 |

(Continued)

FOREIGN PATENT DOCUMENTS

| JP | H2-193106 A | 7/1990 |
| JP | A-H06-130243 | 5/1994 |

(Continued)

*Primary Examiner* — Jimmy Chou
(74) *Attorney, Agent, or Firm* — Faegre Drinker Biddle & Reath LLP

(57) ABSTRACT

A reinforcing apparatus for reinforcing a fusion-splicing part between optical fibers includes a main body part, a heater that heats a heat-shrinkable tube covering the fusion-splicing part, and a pair of clamp parts that are provided at opposite sides of the heater and respectively hold an optical fiber or an optical connector. The pair of the clamp parts respectively include a storage part that stores the optical fiber or the optical connector, and a clamper that is rotatably supported in the main body part and can be disposed in an open state where an upper portion of the storage part is opened and in a closed state where the optical fiber or the optical connector stored in the storage part is sandwiched. A clamp part of at least one part of the pair of clamp parts includes a sliding part that is slidably mounted on a storage part.

5 Claims, 8 Drawing Sheets

(58) Field of Classification Search
USPC ........ 385/95, 96, 98, 99, 134; 219/520, 528, 219/535, 536, 538
See application file for complete search history.

(56) References Cited

U.S. PATENT DOCUMENTS

| | | | | |
|---|---|---|---|---|
| 6,012,856 A * | 1/2000 | Kim | G02B 6/2558 | 385/99 |
| 6,190,057 B1 * | 2/2001 | Osaka | G02B 6/245 | 385/134 |
| 6,206,583 B1 * | 3/2001 | Hishikawa | G02B 6/2551 | 385/96 |
| 6,437,299 B1 * | 8/2002 | Watanabe | G02B 6/2558 | 219/466.1 |
| 6,438,300 B1 * | 8/2002 | Bernstein | G02B 6/4471 | 385/100 |
| 7,040,818 B2 * | 5/2006 | Sato | G02B 6/2558 | 385/136 |
| 7,142,762 B2 * | 11/2006 | Watanabe | G02B 6/2808 | 385/134 |
| 7,364,375 B1 * | 4/2008 | Jones | G02B 6/2551 | 385/95 |
| 7,546,020 B2 * | 6/2009 | Honma | G02B 6/255 | 385/137 |
| D652,212 S * | 1/2012 | Takayanagi | D3/263 | |
| 8,092,100 B2 * | 1/2012 | Song | G02B 6/245 | 385/99 |
| 8,454,340 B1 * | 6/2013 | Loveless | B29C 71/02 | 425/174.6 |
| D709,286 S * | 7/2014 | Takayanagi | D3/263 | |
| 8,950,955 B2 * | 2/2015 | Fukuda | G02B 6/2558 | 385/99 |
| 9,146,353 B2 * | 9/2015 | Kawanishi | G02B 6/3616 | |
| 9,235,005 B2 * | 1/2016 | Sato | G02B 6/2555 | |
| 9,429,708 B2 * | 8/2016 | Kawanishi | G02B 6/2558 | |
| 2001/0041036 A1 * | 11/2001 | Nakamura | G02B 6/2551 | 385/96 |
| 2001/0041037 A1 * | 11/2001 | Nakamura | G02B 6/2551 | 385/96 |
| 2002/0021876 A1 * | 2/2002 | Liberty | G02B 6/2937 | 385/99 |
| 2003/0215195 A1 * | 11/2003 | Koike | G02B 6/2551 | 385/96 |
| 2004/0218878 A1 * | 11/2004 | Takahashi | G02B 6/2558 | 385/99 |
| 2004/0247261 A1 * | 12/2004 | Sato | G02B 6/2558 | 385/99 |
| 2005/0123253 A1 * | 6/2005 | Sato | G02B 6/2553 | 385/99 |
| 2006/0280417 A1 * | 12/2006 | Sato | G02B 6/2553 | 385/134 |
| 2008/0181563 A1 * | 7/2008 | Akiyama | G02B 6/2558 | 385/96 |
| 2008/0282522 A1 * | 11/2008 | Song | G02B 6/25 | 29/33.52 |
| 2009/0162019 A1 * | 6/2009 | Lichoulas | G02B 6/3846 | 385/99 |
| 2009/0238523 A1 * | 9/2009 | Honma | G02B 6/3846 | 385/96 |
| 2009/0263088 A1 * | 10/2009 | Miyamori | G02B 6/2553 | 385/96 |
| 2010/0260458 A1 * | 10/2010 | Sato | G02B 6/2555 | 385/96 |
| 2010/0272405 A1 * | 10/2010 | Song | G02B 6/2553 | 385/96 |
| 2012/0073331 A1 * | 3/2012 | Tachikura | G02B 6/25 | 65/439 |
| 2013/0119044 A1 * | 5/2013 | Gynnild | B29C 66/91212 | 219/221 |
| 2013/0230286 A1 * | 9/2013 | Fukuda | G02B 6/2558 | 385/96 |
| 2013/0236145 A1 * | 9/2013 | Sato | G02B 6/2555 | 385/96 |
| 2013/0236146 A1 * | 9/2013 | Takayanagi | G02B 6/2555 | 385/96 |
| 2013/0284377 A1 * | 10/2013 | Takayanagi | G02B 6/2553 | 156/433 |
| 2013/0315544 A1 * | 11/2013 | Fukuda | G02B 6/2553 | 385/96 |
| 2014/0003785 A1 * | 1/2014 | Sato | G02B 6/2555 | 385/137 |
| 2014/0083141 A1 * | 3/2014 | Iwashita | G02B 6/2553 | 65/484 |
| 2014/0131326 A1 * | 5/2014 | Sato | G02B 6/2553 | 219/121.58 |
| 2014/0157830 A1 * | 6/2014 | Kawanishi | G02B 6/2555 | 65/501 |
| 2014/0165657 A1 * | 6/2014 | Sato | G02B 6/2555 | 65/485 |
| 2015/0049991 A1 * | 2/2015 | Kawanishi | G02B 6/2551 | 385/96 |
| 2015/0185419 A1 * | 7/2015 | Kawanishi | H05B 1/023 | 385/96 |
| 2015/0338582 A1 * | 11/2015 | Halls | G02B 6/2553 | 425/510 |
| 2016/0116675 A1 * | 4/2016 | Sasaki | G02B 6/2553 | 65/485 |
| 2016/0266314 A1 * | 9/2016 | Miyamori | G02B 6/2551 | |
| 2016/0266315 A1 * | 9/2016 | Miyamori | G02B 6/2553 | |
| 2018/0095223 A1 * | 4/2018 | Wiley | G02B 6/2555 | |
| 2018/0275345 A1 * | 9/2018 | Kawanishi | G02B 6/245 | |
| 2020/0134994 A1 * | 4/2020 | Ooki | G08B 13/2417 | |
| 2020/0134997 A1 * | 4/2020 | Ooki | G02B 6/2553 | |
| 2020/0278497 A1 * | 9/2020 | Ooki | G02B 6/2553 | |
| 2020/0292755 A1 * | 9/2020 | Sato | G02B 6/2553 | |
| 2020/0341197 A1 * | 10/2020 | Suzuki | G02B 6/2553 | |
| 2020/0355870 A1 * | 11/2020 | Iida | G02B 6/2558 | |
| 2020/0371492 A1 * | 11/2020 | Ohnishi | G06F 16/245 | |
| 2021/0003779 A1 * | 1/2021 | Wiley | G02B 6/2555 | |

FOREIGN PATENT DOCUMENTS

| | | |
|---|---|---|
| JP | 2002-82257 A | 3/2002 |
| JP | 2003-195090 A | 7/2003 |
| JP | 2004-325623 A | 11/2004 |
| JP | 2013-92810 A | 5/2013 |
| JP | B2-5407540 | 11/2013 |
| WO | WO-2014/157254 A1 | 10/2014 |

* cited by examiner

REINFORCING APPARATUS FOR OPTICAL FIBER FUSION-SPLICING PART AND FUSION SPLICER PROVIDED WITH THE SAME

TECHNICAL FIELD

The present invention relates to a reinforcing apparatus for reinforcing a fusion-splicing part between optical fibers and a fusion splicer provided with the same.

This application is based upon and claims the benefit of priority from Japanese Patent Application No. 2016-100437, filed May 19, 2016, the entire contents of which are incorporated herein by reference.

BACKGROUND ART

Generally, a fusion-splicing part between optical fibers is reinforced by a reinforcing member and a heat-shrinkable tube which is a reinforcing sleeve. In order to mount the heat-shrinkable tube on the fusion-splicing part, a reinforcing apparatus including a heater for heating the fusion-splicing part covered with the heat-shrinkable tube; a guide groove that is disposed on opposite sides of the heater and guides the optical fiber; and a clamper provided in a vicinity of the guide groove for clamping the optical fiber is used (for example, refer to Patent Literature 1).

CITATION LIST

Patent Literature

[Patent Literature 1]: JP-A-2-193106
[Patent Literature 2]: JP-A-2002-82257
[Patent Literature 3]: JP-A-2013-92810

SUMMARY OF THE INVENTION

Solution to Problem

A reinforcing apparatus for an optical fiber fusion-splicing part according to the present invention, which is configured to reinforce a fusion-splicing part between optical fibers may include a main body part, a heater provided on the main body part to heat a heat-shrinkable tube covering the fusion-splicing part, and a pair of clamp parts provided at opposite sides of the heater to hold an optical fiber or an optical connector from which the optical fiber is exposed, wherein the pair of the clamp parts may respectively include
a storage part connected to the main body part to store the optical fiber or the optical connector, and a clamper rotatably supported and connected to the main body part and configured to be able to be disposed in an open state where an upper portion of the storage part is opened when the clamper is opened to the main body part and in a closed state where the optical fiber or the optical connector stored in the storage part is sandwiched when the clamper is closed to the main body part, at least one part of the pair of clamp parts further includes a sliding part that is slidably mounted on the storage part, and the sliding part is slid between a first position and a second position so that a height of a placement surface on which the optical fiber or the optical connector is placed in the storage part is changeable.

Further, in order to achieve the above-mentioned object, a fusion splicer of the present invention is provided with the reinforcing apparatus for the optical fiber fusion-splicing part.

DESCRIPTION OF EMBODIMENTS

Technical Problem

Figure 1:
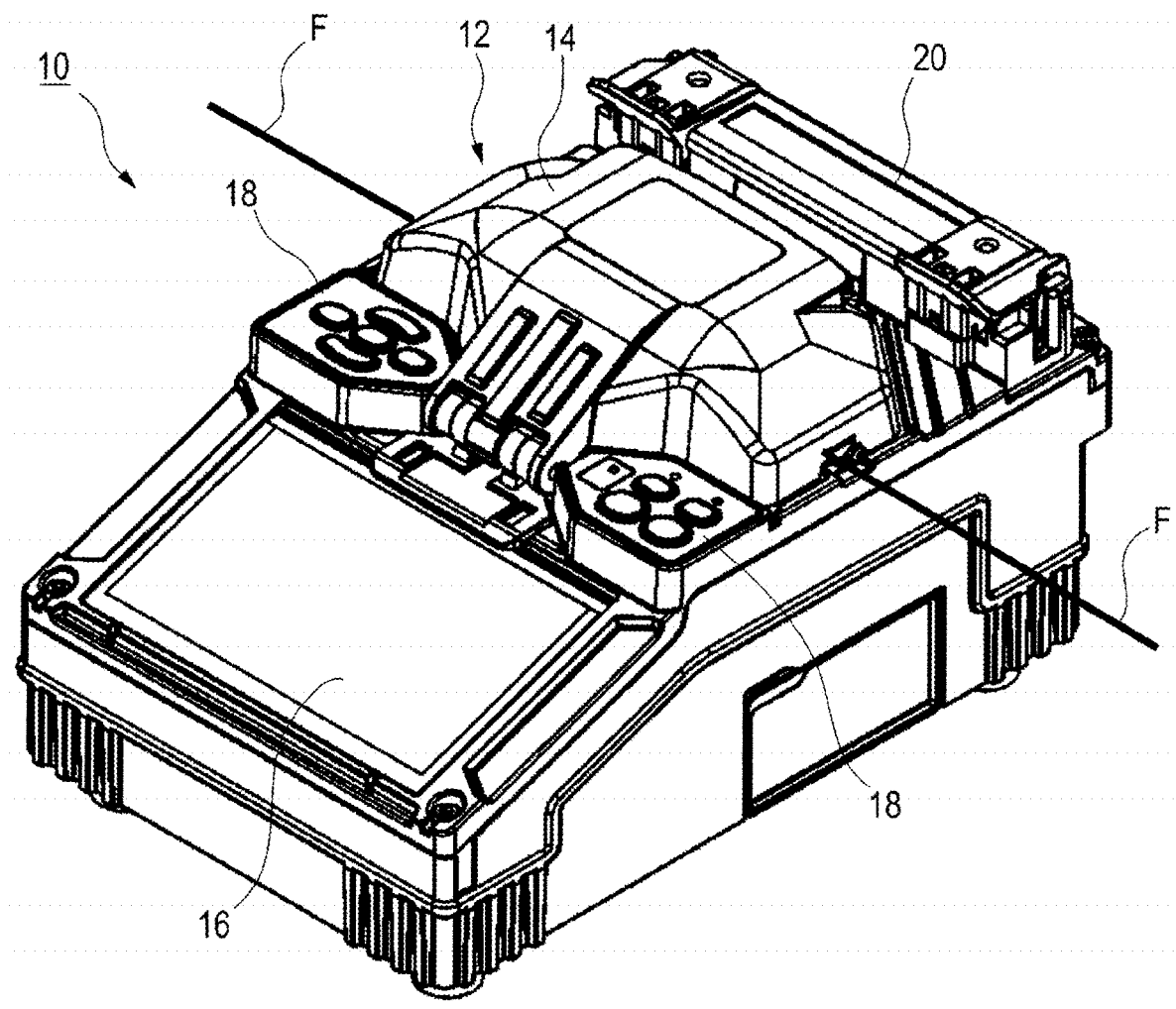
FIG. 1 is a perspective diagram illustrating an example of a fusion splicer according to the present invention.

Meanwhile, processing in which the optical fibers are fusion-spliced to each other and the fusion-splicing part is reinforced is not limited to a case in which single-core optical fibers are fusion-spliced to each other. Alternatively, there exists a case in which fusion splicing between a single-core optical fiber and a short optical fiber exposed from an optical connector is performed (for example, refer to Patent Literature 2). In this case, in the case of the clamper of Patent Literature 1, the optical connector which is fusion-spliced to the single-core optical fiber cannot be clamped. Further, when the optical connector is mounted on a substrate of Patent Literature 1, since the short optical fiber exposed from the optical connector is disposed at a higher position than the single-core optical fiber which is a fusion-splicing target, the fusion-splicing part and a heat-shrinkable tube covering the fusion-splicing part are obliquely disposed inside a heater. When the heater is caused to generate heat in this state, the heat-shrinkable tube cannot be appropriately heated, and there exists a possibility that the fusion-splicing part cannot be desirably reinforced.

Further, instead of the clamper of Patent Literature 1, a configuration, in which an optical connector is stored in an optical fiber holder as disclosed in Patent Literature 3, and the optical fiber holder is mounted on the reinforcing apparatus of Patent Literature 1, can be also considered, however, there exists a drawback in that the clamper is required to be replaced depending on a size of an optical fiber product to be clamped (for example, a single-core optical fiber or an optical connector).

The present invention has been made in an effort to provide a reinforcing apparatus for an optical fiber fusion-splicing part that is capable of desirably holding different types of optical fiber products and a fusion splicer provided with the same, without requirement of replacing a clamp component depending on an optical fiber product to be clamped.

Advantageous Effects of the Invention

According to the present invention, it is possible to provide a reinforcing apparatus for an optical fiber fusion-splicing part that is capable of desirably holding different types of optical fiber products and a fusion splicer provided with the same, without requirement of replacing a clamp component depending on an optical fiber product to be clamped.

Descriptions of Embodiment of the Invention

First, the embodiment of the present invention will be described.

(1) A reinforcing apparatus for an optical fiber fusion-splicing part according to the embodiment of the present invention, which is configured to reinforce a fusion-splicing part between optical fibers may include a main body part, a heater provided on the main body part to heat a heat-shrinkable tube covering the fusion-splicing part, and a pair of clamp parts provided at opposite sides of the heater to hold an optical fiber or an optical connector from which the optical fiber is exposed, wherein the pair of the clamp parts may respectively include a storage part provided in the main body part to store the optical fiber or the optical connector, and a clamper rotatably supported in the main body part and configured to be able to be disposed in an open state where an upper portion of the storage part is opened when the clamper is opened to the main body part and in a closed state where the optical fiber or the optical connector stored in the storage part is sandwiched when the clamper is closed to the main body part, at least one part of the pair of clamp parts may further include a sliding part that is slidably mounted on the storage part, and the sliding part is slid between a first position and a second position so that a height of a placement surface on which the optical fiber or the optical connector is placed in the storage part is changeable.

According to the configuration described above, a clamp component is not required to be replaced depending on an optical fiber product to be clamped, whereby it is possible to provide a reinforcing apparatus for an optical fiber fusion-splicing part that is capable of desirably holding different kinds of optical fiber products.

(2) The storage part may include a first groove part provided along a direction orthogonal to a longitudinal direction of the optical fiber stored in the storage part, and the sliding part may include a first protrusion part protruding toward a side of the storage part and engageable with the first groove part.

According to the configuration described above, the sliding part can be smoothly slid in a desired direction with a simple configuration. Further, "orthogonal" in the configuration (2) and the following descriptions does not mean "orthogonal" in a strict sense, but means that the "orthogonal" has a width in a range of exerting an effect of the present invention when the range is regarded as the orthogonal.

(3) The storage part may further include a second groove part provided in parallel to the first groove part and provided with a first notch part and a second notch part separated from the first notch part, the sliding part may further include a second protrusion part protruding toward the side of the storage part and inserted into the second groove part, and the second protrusion part may be determined to be positioned at the first position by being engaged with the first notch part, and may be determined to be positioned at the second position by being engaged with the second notch part.

According to the configuration described above, the sliding part can be easily determined to be positioned at the first position and the second position. Further, "parallel" in the configuration (3) and the following descriptions does not mean "parallel" in a strict sense, but means that the "parallel" has a width in a range of exerting an effect of the present invention when the range is regarded as the parallel.

(4) A fusion splicer according to the embodiment of the present invention may include the reinforcing apparatus according to any one of the configurations (1) to (3).

According to the configuration described above, a clamp component is not required to be replaced depending on an optical fiber product to be clamped, whereby it is possible to provide a fusion splicer provided with the reinforcing apparatus for the optical fiber fusion-splicing part that is capable of desirably holding different kinds of optical fiber products.

(5) In the fusion splicer according to the configuration (4), a convex part protruding toward an upper portion may be provided at a position opposite to an end part of the sliding part.

According to the configuration described above, it is possible to prevent the sliding part from slipping out of the storage part.

Details of Embodiment of the Present Invention

Hereinafter, an embodiment of a reinforcing apparatus for an optical fiber fusion-splicing part and a fusion splicer according to the present invention will be described with reference to the drawings.

As shown in FIG. 1, for example, a fusion splicer 10 fusion-splices optical fibers F at a site where the construction of optical fiber facilities is performed, and further reinforces a fusion-splicing part thereof. The fusion splicer 10 is provided with a fusion processing part 12 for fusion-splicing the optical fibers F; and a reinforcing apparatus 20 for reinforcing the optical fiber fusion-splicing part.

The fusion processing part 12 can be opened and closed by an opening and closing cover 14. An end surface of the optical fiber F extending from an optical fiber holder mounted on an inside of the opening and closing cover 14 is disposed at a fusion position in a state where the opening and closing cover 14 is opened. In the fusion processing part 12, the end surfaces of the optical fibers F are fusion-spliced to each other by discharge of a pair of electrodes at a fusion position where the pair of electrodes (not shown) are disposed to be opposite to each other.

Further, the fusion splicer 10 is provided with a monitor 16 on a front surface side thereof. The monitor 16 projects, for example, an image of a fusion point of the optical fiber F photographed by a microscope provided with an imaging element such as a CCD, and the like. Further, an operator can perform fusion work while watching an image of the monitor 16. Additionally, the monitor 16 also serves as an operation part for operating the fusion processing part 12 and the reinforcing apparatus 20, and various operations can be performed by touching the monitor 16. Further, an operation part 18 including a power switch, and the like is provided on the upper left and right sides of the monitor 16.

Figure 2:
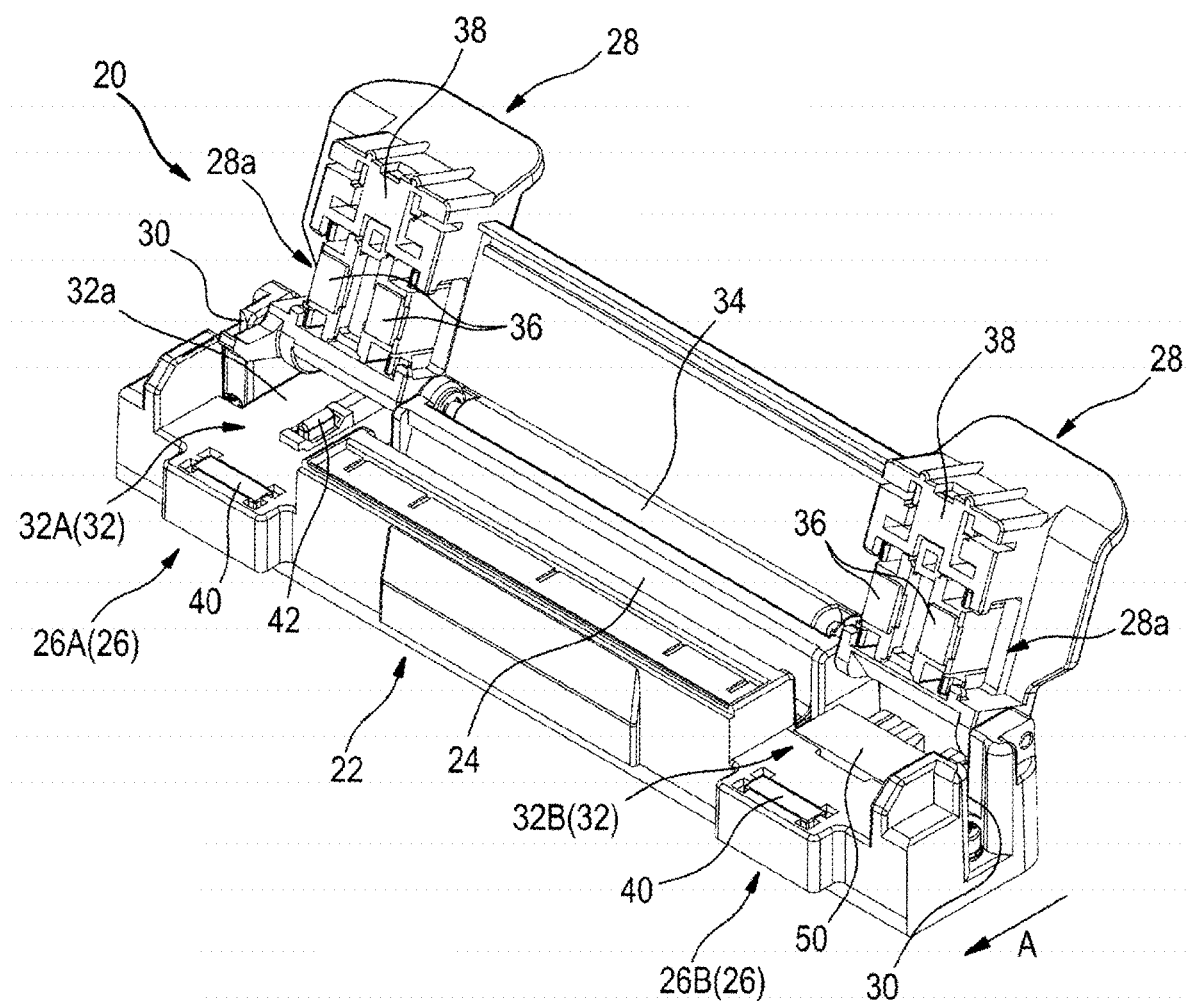
FIG. 2 is a perspective diagram illustrating a state where a clamper of a reinforcing apparatus is opened in the reinforcing apparatus included in the fusion splicer of FIG. 1.

As shown in FIG. 2, the reinforcing apparatus 20 is provided with a main body part 22, a heater 24, and a clamp part 26. The heater 24 is provided at a center part of the main body part 22, and stores the fusion-splicing part between the optical fibers F and a heat-shrinkable tube (not shown) covering an outer periphery of the fusion-splicing part. The heater 24 generates heat, such that the heat-shrinkable tube is heated and shrunk. Further, the heater 24 is provided with a heating temperature distribution so that a central part of the heat-shrinkable tube is heated at a high temperature to be shrunk, after which an end part of the heat-shrinkable tube is shrunk. Accordingly, a void generated in the heat-shrinkable tube during the heating is easily released from opposite end parts.

A pair of the clamp parts 26 respectively including a clamper 28 for holding the optical fiber F are provided on opposite sides of the heater 24. The optical fiber F is clamped by the clamp parts 26, such that the fusion-splicing part of the optical fiber F is determined to be positioned and disposed in the heater 24.

Guide grooves 30 for storing the optical fibers F are respectively formed in the respective clamp parts 26 on a side of the main body part 22. In the embodiment, spaces between the respective guide grooves 30 and the heater 24 are referred to as storage parts 32. The respective optical fibers F which are inserted into the guide grooves 30 and disposed on the storage parts 32 are clamped by the clampers 28 respectively.

The clamper 28 is rotatably supported around a rotary shaft 34 provided along the heater 24. Accordingly, the clamper 28 is rotated around the rotary shaft 34, such that, as shown in FIG. 2, the clamper 28 can be disposed in an open state of being opened with respect to the main body part 22, and, as shown in FIG. 1, the clamper 28 can be disposed in a closed state of being overlapped on the main body part 22 and thus closing the heater 24. The clamper 28 has a clamp surface 36 on an opposite surface 28a opposite to the storage part 32 of the main body part 22 in the closed state. Further, the clamper 28 is provided with a magnet 38 on the opposite surface 28a. The magnet 38 is provided at a position farther from the rotary shaft 34 than the clamp surface 36 on the opposite surface 28a of the clamper 28. When the clamper 28 is in the closed state, the clamp surface 36 is disposed at a position where the clamp surface 36 is opposite to the storage part 32. Further, at this time, the magnet 38 provided on the clamper 28 is attracted to a magnet 40 provided on the main body part 22. Thus, when the clamper 28 is closed in a state where the optical fiber F is disposed in the storage part 32, the optical fiber F is sandwiched and held between an upper surface of the main body part 22 forming the storage part 32 and the clamp surface 36 of the clamper 28. Further, at this time, the magnet 38 of the clamper 28 and the magnet 40 of the main body part 22 are attracted to each other, whereby the optical fiber F is maintained in a state of being sandwiched between the upper surface of the main body part 22 forming the storage part 32 and the clamp surface 36.

Of the pair of clamp parts 26, a switch 42 is provided so as to protrude upward from a placement surface 32a on which the optical F is placed in the storage part 32A of a first clamp part 26A provided on the left side of the heater 24 in FIG. 2. The switch 42 is connected to a controller of the heater 24 through a conducting wire which is not illustrated in the drawing. Then, the clamper 28 is closed in a state where the optical fiber F is disposed on the placement surface 32a of the storage part 32A, such that the switch 42 is pressed by the optical fiber F sandwiched between the placement surface 32a and the clamp surface 36. When the switch 42 is pressed, it is determined that the optical fiber F is appropriately sandwiched between the placement surface 32a and the clamp surface 36, and heating processing by the heater 24 starts.

On the other hand, a sliding part 50 is slidably mounted on a storage part 32B of a second clamp part 26B provided on a right side of the heater 24 in FIG. 2 of the pair of clamp parts 26. The sliding part 50, which will be described in detail later, is slidable in a direction orthogonal to a longitudinal direction of the optical fiber F stored in the heater 24 (a direction of an arrow mark A in FIG. 2).

Figure 3:
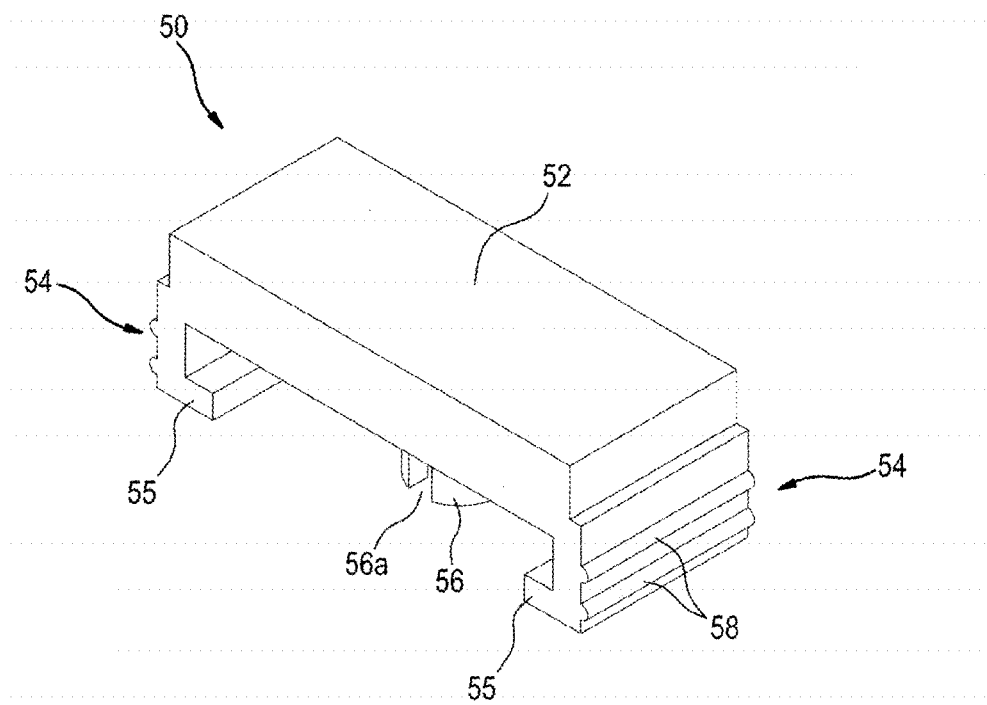
FIG. 3 is a perspective diagram of a sliding part included in the reinforcing apparatus of FIG. 2.
Figure 4:
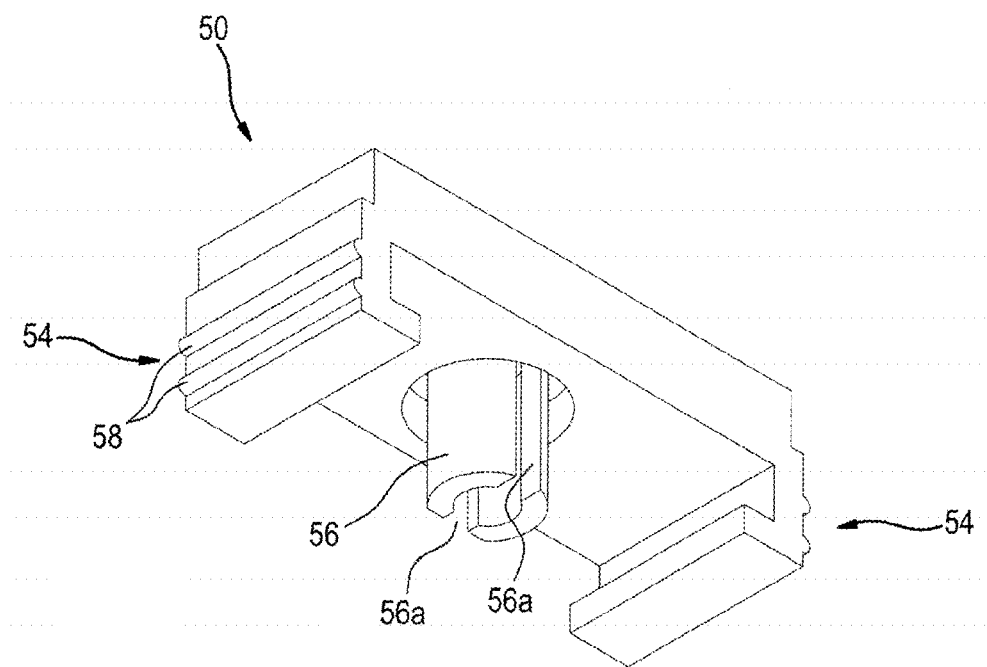
FIG. 4 is a perspective diagram of a bottom side of the sliding part in FIG. 3.

As shown in FIGS. 3 and 4, the sliding part 50 is provided with a placement surface 52 on which the optical fiber F is placed; a pair of engagement protrusions 54 (an example of a first protrusion part) protruding downward from opposite ends of the placement surface 52; and a latch part 56 for determining position (an example of a second protrusion part) protruding downward from between the pair of the engagement protrusions 54. The placement surface 52 is formed so as to be the same height as the placement surface 32a of the first clamp part 26A in a state where the sliding part 50 is mounted on the storage part 32B (refer to FIG. 2). Further, "the same height" does not mean the same height in a strict sense, but means that the same height has a width in a range of exerting an effect of the present invention when the range is regarded as the same height. The pair of engagement protrusions 54 are formed in an L-shape in such manner that tip parts 55 thereof are respectively bent toward a side of the latch part 56 side. Two protrusion parts 58 are formed on outer surfaces of the respective engagement protrusions 54 along a sliding direction (the direction of the arrow mark A in FIG. 2) of the sliding part 50 with respect to the storage part 32B. The latch part 56 is formed in a cylindrical shape, and a pair of slits 56a are provided along a longitudinal direction thereof.

Figure 5:
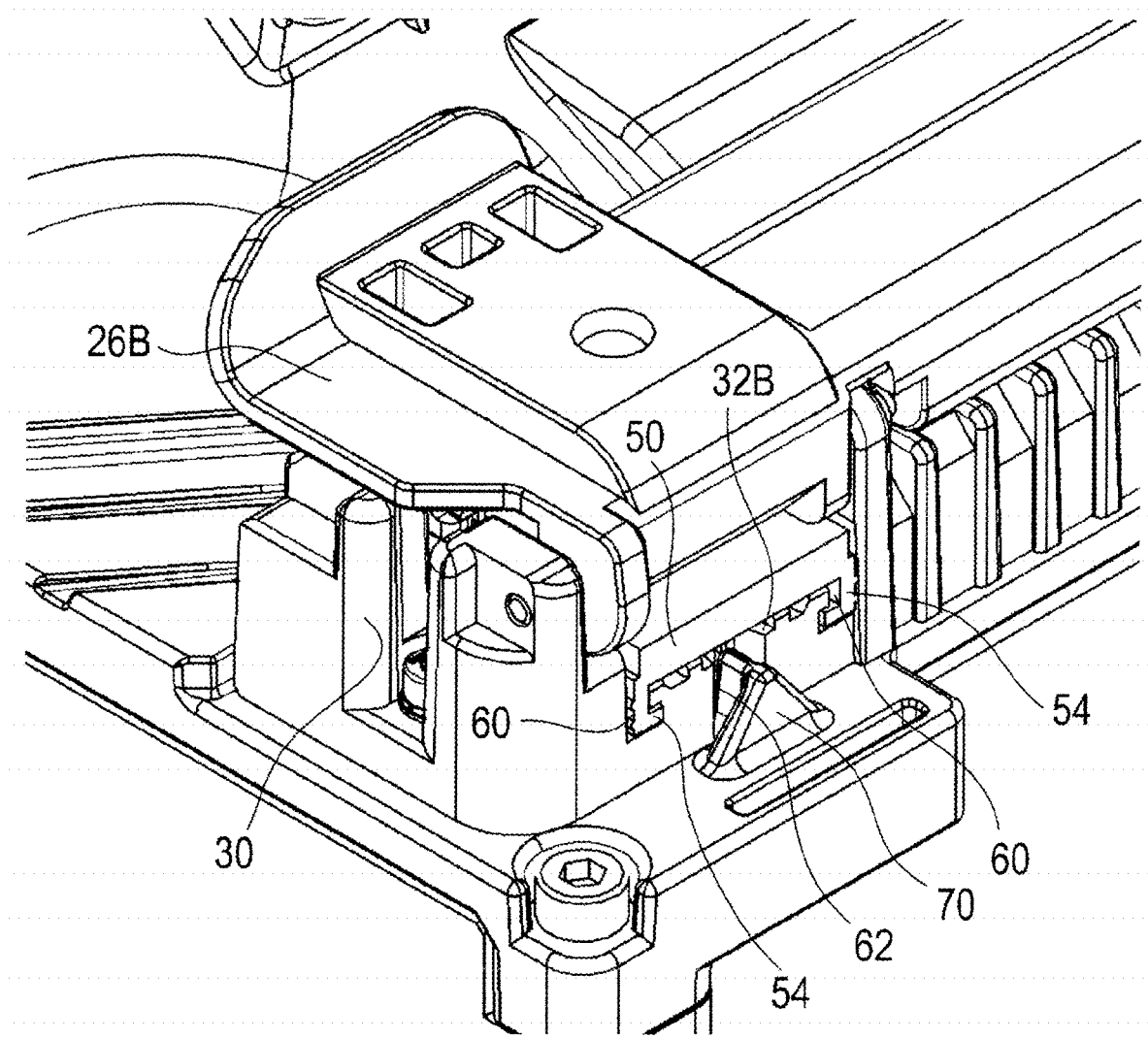
FIG. 5 is a perspective diagram of a rear-side of the reinforcing apparatus in a state of being mounted on a fusion splicer.
Figure 6:
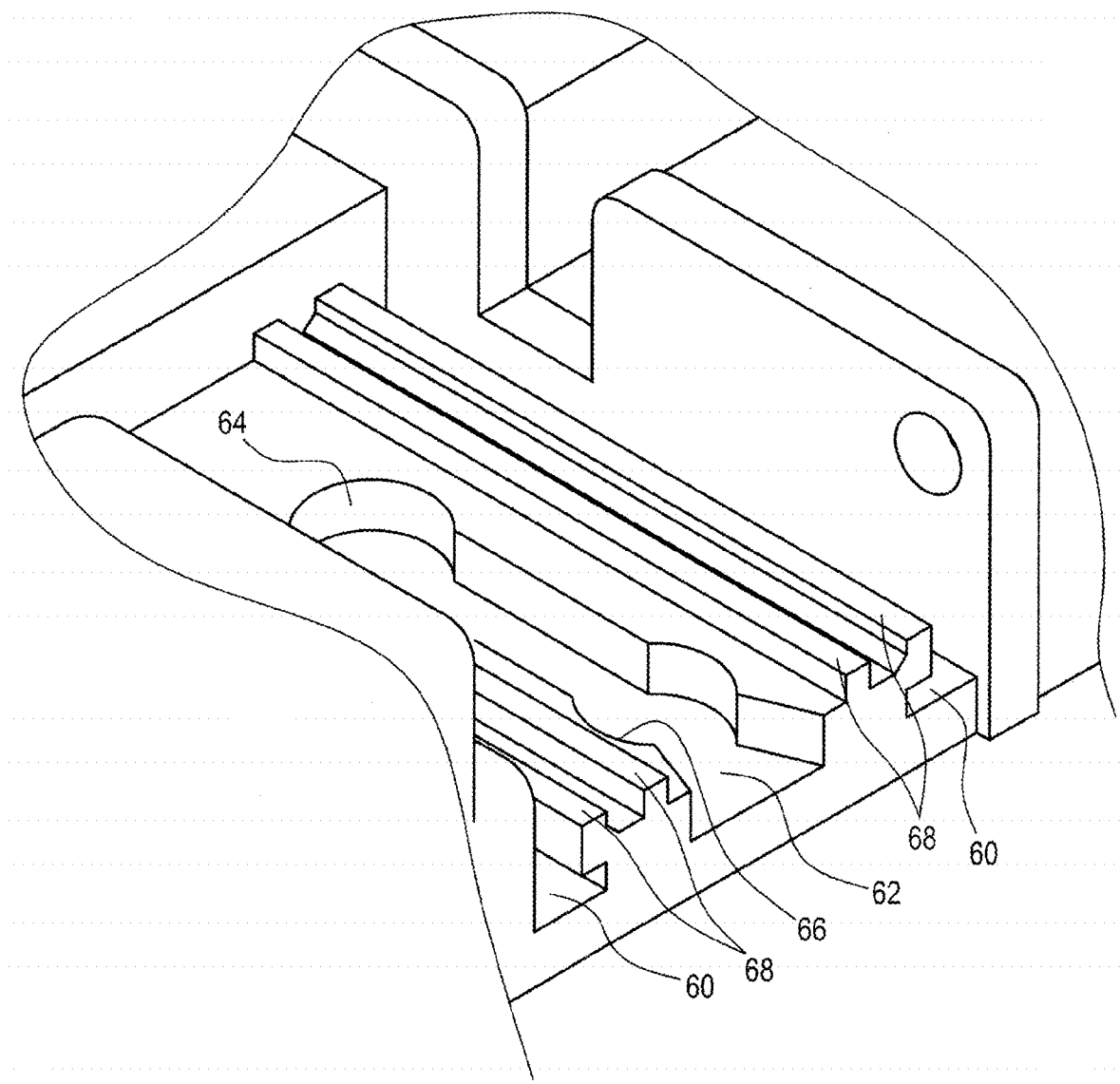
FIG. 6 is a plan diagram of a groove part formed in a storage part of the reinforcing apparatus.

As shown in FIGS. 5 and 6, a pair of first groove parts 60 that are engageable with the respective engagement protrusions 54 of the sliding part 50 are formed in the storage part 32B of the second clamp part 26B. The first groove part 60 is provided along a direction orthogonal to the longitudinal direction of the optical fiber F held in the storage part 32B (the direction of the arrow mark A in FIG. 2) and is cut out as an L shape according to a shape of the tip part 55 of each engagement protrusion 54 in a cross section along the longitudinal direction of the optical fiber F. Further, a second groove part 62 for determining position of the sliding part 50 is formed between the pair of first groove parts 60. As shown in FIG. 2, and the like, an upper surface (a placement surface 65) of the first groove part 60 and the second groove part 62 is formed to be positioned lower than the placement surface 32a of the first clamp part 26A. In the second groove part 62, as shown in FIG. 6, a first notch part 64 that is expanded in a circular shape at an innermost portion thereof; and a second notch part 66 that is disposed separately from the first notch part 64 and expanded in a circular shape in the same manner as that of the first notch part 64 are formed. A width of the second groove part 62 is formed so as to be slightly narrower than a diameter at normal time of the latch part 56 of the sliding part 50. On the other hand, a diameter of the first notch part 64 and a diameter of the second notch part 66 are formed to be sizes corresponding to the diameter at normal time of the latch part 56. Further, a plurality of protrusion parts 68 provided along longitudinal directions of the groove parts 60 and 62 are formed between the first groove part 60 and the second groove part 62.

Next, processing, in which the optical fibers F are fusion-spliced to each other by using the above-mentioned fusion splicer 10, after which the fusion-splicing part is reinforced, will be described. Further, in FIGS. 2, 5, 7, and 8, drawings illustrating the optical fiber F which is processed to be reinforced are omitted.

Fusion-Splicing Processing

First, the heat-shrinkable tube passes through any one of the optical fibers F among the respective optical fibers F which will be spliced to each other. Next, the optical fiber holder of the fusion processing part 12 is caused to hold the optical fiber F in a state where the opening and closing cover 14 is opened. Accordingly, the pair of optical fibers F are determined to be positioned at a fusion position of the fusion processing part 12 and are butted against each other. In this state, the fusion processing part 12 is operated by the monitor 16 so as to discharge electricity, and the end surfaces of the optical fibers F are fusion-spliced to each other. After the optical fibers F are fusion-spliced to each other, the optical fibers F are removed from the optical fiber holders of the respective fusion processing parts 12.

Reinforcing Processing

Figure 7:
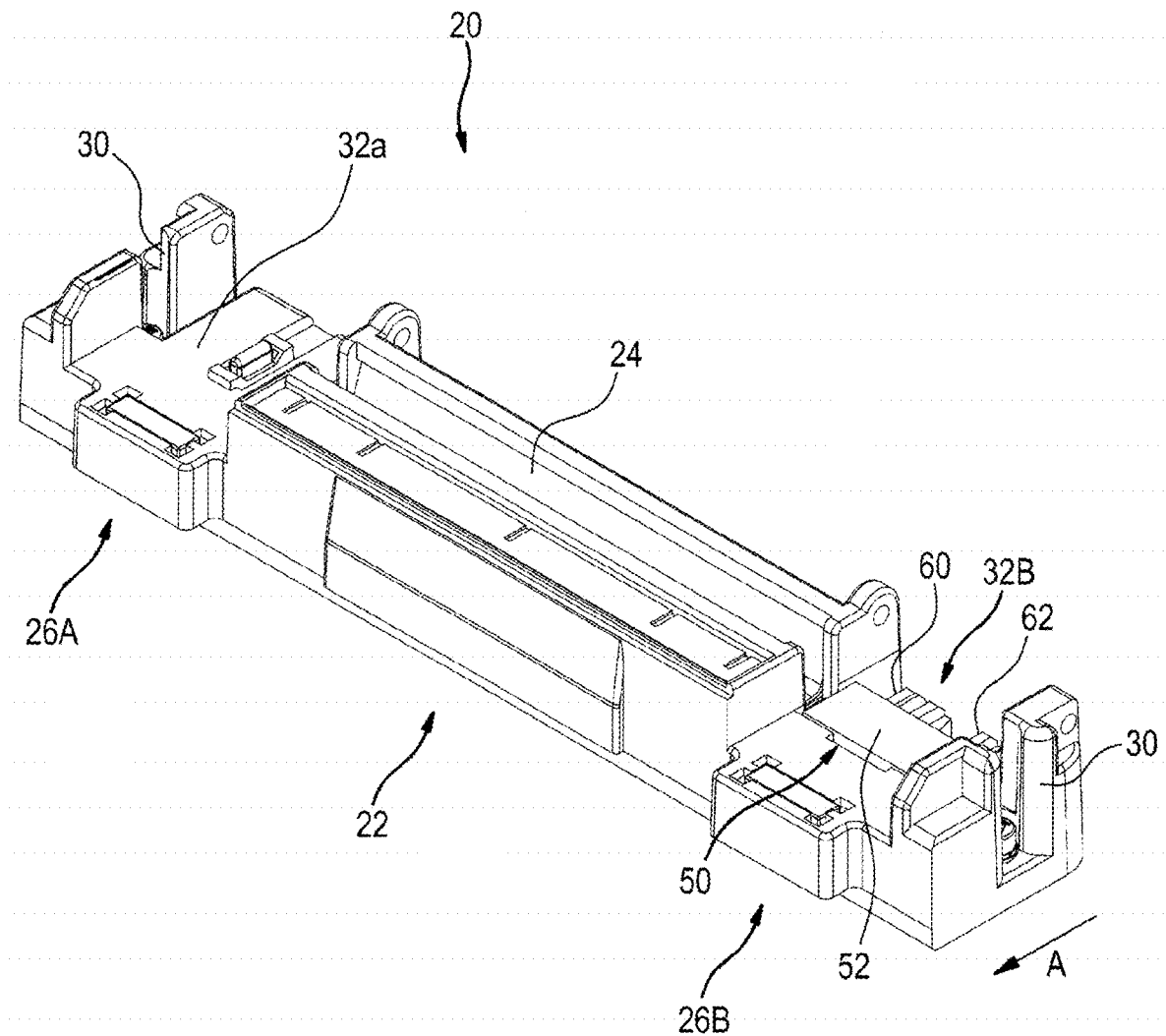
FIG. 7 is a perspective diagram illustrating a state where the sliding part is disposed at a first position in the reinforcing apparatus in a state where the clamper is removed.
Figure 8:
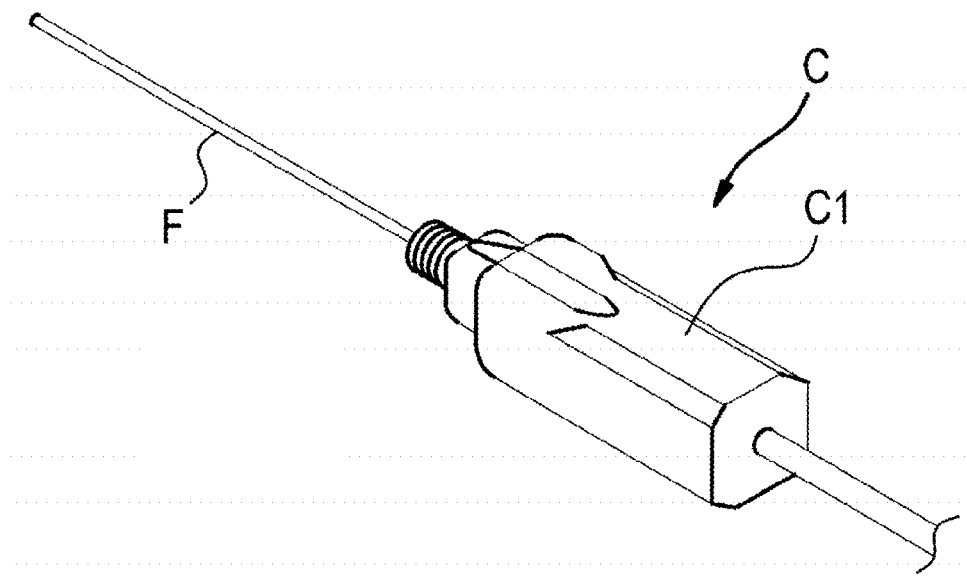
FIG. 8 is a perspective diagram illustrating an optical connector.

The clamper 28 of the reinforcing apparatus 20 is rotated to keep the clamp part 26 in the open state (refer to FIG. 2). As shown in FIG. 7, the sliding part 50 becomes slidable in a direction orthogonal to the longitudinal direction of the optical fiber F (a direction of an arrow mark A in FIG. 7) in such a manner that the pair of engagement protrusions 54 (refer to FIGS. 3 and 4) are respectively engaged with the first groove parts 60 formed in the storage part 32B of the second clamp part 26B. At this time, the latch part 56 of the sliding part 50 is inserted into the second groove part 62 formed in the storage part 32B. Since the pair of slits 56a are formed in the latch part 56, the latch part 56 is deformed so as to narrow a diameter thereof when passing through the second groove part 62. Accordingly, the latch part 56 can be inserted into the second groove part 62 having a width narrower than the diameter at the normal time of the latch part 56. When the latch part 56 inserted into the second groove part 62 moves to a position of the first notch part 64 in the direction of the arrow mark A, the latch part 56 returns to a radial direction so as to become the diameter at the normal time, such that the latch part 56 is held at the position of the first notch part 64. In the above-mentioned manner, the sliding part 50 can be determined to be positioned at a first position shown in FIG. 7.

Next, the heat-shrinkable tube covers the fusion-splicing part of the optical fiber F along a reinforcing member (not shown). After that, the fusion-splicing part covered with the heat-shrinkable tube is disposed above the heater 24, and the optical fiber F is inserted into the guide groove 30. Accordingly, the optical fiber F is disposed on the placement surface 32a in the first clamp part 26A, whereas the optical fiber F is disposed on the placement surface 52 of the sliding part 50 determined to be positioned at the first position shown in FIG. 7 in the second clamp part 26B. In this state, when the clamper 28 (refer to FIG. 2) is closed, the magnet 38 of the clamper 28 and the magnet 40 of the main body part 22 are attracted to each other, whereby the optical fiber F disposed on the side of the first clamp part 26A is sandwiched and held between the placement surface 32a and the clamp surface 36 of the clamper 28. On the other hand, the optical fiber F disposed on the side of the second clamp part 26B is sandwiched and held by the placement surface 52 of the sliding part 50 and the clamp surface 36 of the clamper 28. Accordingly, the fusion-splicing part of the optical fibers F covered with the heat-shrinkable tube is determined to be positioned and disposed along a horizontal direction in the heater 24.

In this state, the heater 24 is caused to generate heat, whereby the heat-shrinkable tube is heat shrunk by the heater 24. Accordingly, the fusion-splicing part between the optical fibers F is placed along the reinforcing member, and further covered with the heat-shrinkable tube which is closely adhered thereto, thereby being integrated and reinforced. After that, the clamper 28 of the clamp part 26 is rotated to be in the open state, the optical fiber F, the fusion-splicing part of which is reinforced, is taken out.

Meanwhile, when the fusion-splicing part is reinforced by the aforementioned reinforcing apparatus 20, it is not limited to a case of reinforcing the fusion-splicing part between the single-core optical fibers F. Alternatively, there exists a case in which a fusion-splicing part between the single-core optical fiber F and an optical fiber F exposed from a connector product such as, for example, an optical connector C shown in FIG. 8, and the like, is reinforced. However, when a main body part C1 of the optical connector C is disposed on the placement surface 52 of the sliding part 50, the optical fiber F exposed from the optical connector C is disposed at a position higher than the single-core optical fiber F which is a fusion-splicing target. Therefore, in this case, the fusion-splicing part and the heat-shrinkable tube covering the fusion-splicing part are obliquely disposed in the heater 24. When the heater 24 is caused to generate the heat in this state, the heat-shrinkable tube cannot be heated with a desired heating temperature distribution, and the void generated in the heat-shrinkable tube during the heating do not escape from opposite end parts, such that it is considered that desirable reinforcing processing is inhibited.

Figure 9:
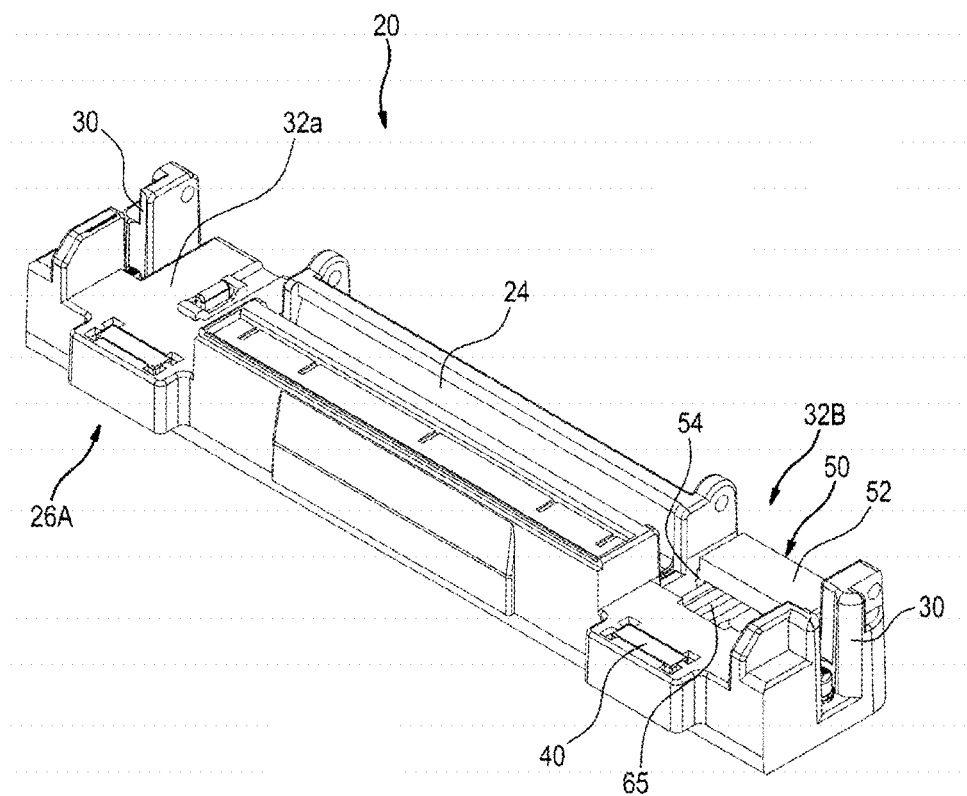
FIG. 9 is a perspective diagram illustrating a state where the sliding part is disposed at a second position in the reinforcing apparatus of FIG. 7.

Here, in the reinforcing apparatus 20 according to the embodiment, when performing the reinforcing processing on the optical fiber F exposed from the optical connector C, that is, when the main body part C1 of the optical connector C is stored in the storage part 32B, as shown in FIG. 9, the sliding part 50 is slid in a direction opposite to the magnet 40, and the latch part 56 is engaged with the second notch part 6. Thus, the sliding part 50 is determined to be positioned at a second position separated from the first position. Accordingly, the placement surface 65 which is the upper surface of the first groove part 60 and the second groove part 62 is exposed in the storage part 32B of the second clamp part 26B by sliding the sliding part 50 to the second position.

Figure 10:
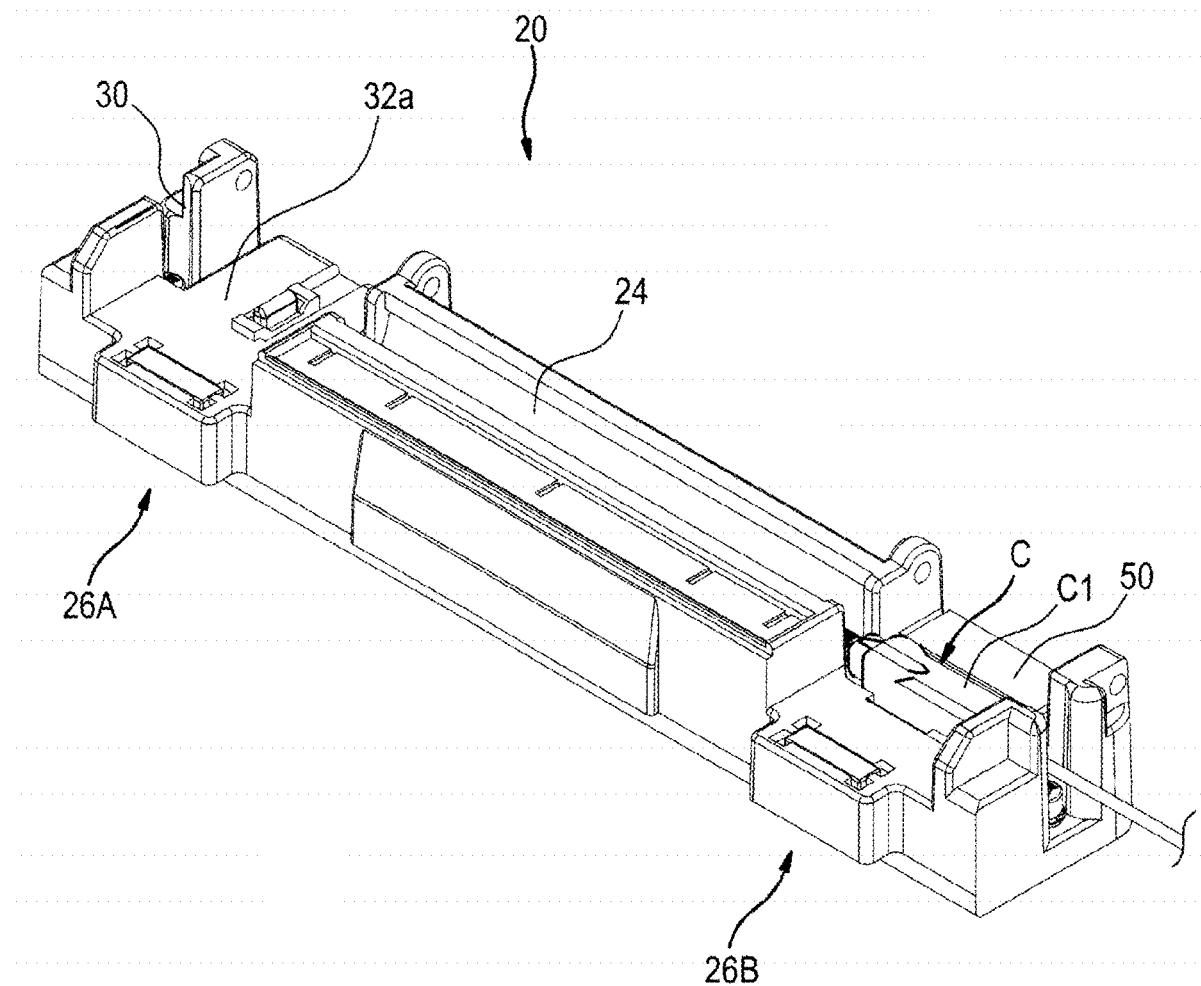
FIG. 10 is a perspective diagram illustrating a state where the optical connector of FIG. 8 is stored in the reinforcing apparatus of FIG. 9.

As described above, the placement surface 65 is configured to be positioned lower than the placement surface 32a of the first clamp part 26A. Therefore, as described above in FIG. 10, in a state where the sliding part 50 is determined to be positioned at the second position, the main body part C1 of the optical connector C is placed on the placement surface 65 of the second clamp part 26B, whereby a height between the optical fiber F exposed from the main body part C1 of the optical connector C placed on the placement surface 65 and the single-core optical fiber F placed on the placement surface 32a of the first clamp part 26A can be coincided with each other. Accordingly, the fusion-splicing part between the single-core optical fiber F and the optical fiber F exposed from the optical connector C and the heat-shrinkable tube can be disposed in the horizontal direction in the heater 24. Therefore, even when performing the reinforcing processing on the fusion-splicing part between the single-core optical fiber F and the optical fiber F exposed from the optical connector C, the heat-shrinkable tube can be smoothly heated by the heater 24, such that the fusion-splicing part can be desirably reinforced.

As described above, the reinforcing apparatus 20 according to the embodiment is provided with the main body part 22; the heater 24 provided in the main body part 22 for heating the heat-shrinkable tube covering the fusion-splicing part of the optical fiber F; and the pair of clamp part 26 provided on opposite sides of the heater 24 for respectively holding the optical fiber F or the optical connector C. The pair of clamp parts 26 includes the storage part 32 provided on the side of the main body part 22 for storing the optical fiber F or the optical connector C; and the clamper 28 that is rotatably supported by the main body part 22 and can be disposed in the open state where an upper portion of the storage part 32 is opened by opening the clamper 28 with respect to the main body part 22 and the closed state where the optical fiber F or the optical connector C stored in the storage part 32 is sandwiched by closing the clamper 28 with respect to the main body part 22. The second clamp part 26B of the pair of clamp parts 26 has the sliding part 50 that is slidably mounted on the storage part 32B. Further, the sliding part 50 is slid between the first position and the second position, whereby heights of the placement surfaces 52 and 65 on which the optical fiber F or the optical connector C is placed in the storage part 32B can be changed. According to the configuration, the reinforcing apparatus 20 can satisfactorily hold not only the fusion-splicing part between the single-core optical fibers F but also the fusion-splicing part between the single-core optical fiber F and the optical fiber F exposed from the optical connector C. As described above, since the reinforcing apparatus 20 according to the embodiment is not required to replace a clamp component depending on an optical fiber product to be clamped, operation efficiency when performing the reinforcing processing on the fusion-splicing part of the optical fiber F can be improved.

Further, in the embodiment, the storage part 32B includes the first groove part 60 provided along the direction orthogonal to the longitudinal direction of the optical fiber F stored in the storage part 32, and the sliding part 50 includes the engagement protrusion 54 protruding toward the side of the storage part 32B and engageable with the first groove part 60. According to the configuration, the sliding part 50 can be smoothly slid in a desired direction with a simple configuration.

Further, in the embodiment, the storage part 32B further includes the second groove part 62 that is provided in parallel to the first groove part 60 and provided with the first notch part 64 and the second notch part 66 separated from the first notch part 64, and the sliding part 50 further includes the latch part 56 that protrudes toward the side of the storage part 32B and is inserted into the second groove part 62. The latch part 56 is determined to be positioned at the first position shown in FIG. 7 by being engaged with the first notch part 64, and positioned at the second position shown in FIG. 9 by being engaged with the second notch part 66. According to the configuration, the sliding part 50 can be appropriately determined to be positioned at the first position and the second position with a simple constitution.

Further, as shown in FIG. 5, in the fusion splicer 10, a convex part 70 protruding toward an upper surface is provided at a position opposite to an end part of the sliding part 50 of the reinforcing apparatus 20. In a state where the reinforcing apparatus 20 is mounted on the fusion splicer 10, a part of a rear surface side of the storage part 32B and the end part of the sliding part 50 are blocked by the convex part 70. Accordingly, when the sliding part 50 is slid, it is possible to prevent the sliding part 50 from slipping out of the rear surface side of the storage part 32B.

Further, as described above, two protrusion parts 58 are formed along the sliding direction (the direction of the arrow mark A in FIG. 2) of the sliding part 50 on the outer surface of each engagement protrusion 54 of the sliding part 50. The plurality of protrusion parts 68 provided along the longitudinal directions of the first groove part 60 and the second groove part 62 are formed between the first groove part 60 and the second groove part 62. Accordingly, the sliding part 50 can be smoothly slid with respect to the storage part 32B.

As described above, while the present invention is described in detail with reference to the specific embodiments, it is apparent to those skilled in the art that various modifications and corrections can be added without departing from the spirit and scope of the present invention. Further, the number, position, shape, and the like of the configuration members described above are not limited to those in the embodiments described above, and can be modified to the number, position, shape, and the like suitable for performing the present invention.

REFERENCE SIGNS LIST

10: fusion splicer
12: fusion processing part
14: opening and closing cover
16: monitor
20: reinforcing apparatus
22: main body part
24: heater
26: pair of clamp parts
26A: first clamp part
26B: second clamp part
28: clamper
30: guide groove
32, 32A, 32B: storage part
32a: placement surface
34: rotary shaft
36: clamp surface
38, 40: magnet
42: switch
50: sliding part
52: placement surface
54: pair of engagement protrusions (one example of the first protrusion part)
56: latch part (one example of the second protrusion part)
60: first groove part
62: second groove part
64: first notch part
65: placement surface
66: second notch part
70: convex part
F: optical fiber
C: optical connector

The invention claimed is:

1. A reinforcing apparatus for an optical fiber fusion-splicing part, configured to reinforce a fusion-splicing part between optical fibers, comprising:

a main body part;

a heater provided on the main body part to heat a heat-shrinkable tube covering the fusion-splicing part; and a pair of clamp parts provided at opposite sides of the heater to hold an optical fiber or an optical connector from which the optical fiber is exposed, wherein the pair of the clamp parts respectively include a storage part connected to the main body part to store the optical fiber or the optical connector, and a clamper rotatably supported and connected to the main body part and configured to be able to be disposed in an open state where an upper portion of the storage part is opened when the clamper is opened to the main body part and in a closed state where the optical fiber or the optical connector stored in the storage part is sandwiched when the clamper is closed to the main body part, at least one part of the pair of clamp parts further includes a sliding part that is slidably mounted on the storage part, and the sliding part is slid between a first position and a second position so that a height of a placement surface on which the optical fiber or the optical connector is placed in the storage part is changeable.

2. The reinforcing apparatus according to claim 1, wherein the storage part includes a first groove part provided along a direction orthogonal to a longitudinal direction of the optical fiber stored in the storage part, and the sliding part includes a first protrusion part protruding toward a side of the storage part and engageable with the first groove part.

3. The reinforcing apparatus according to claim 2, wherein the storage part further includes a second groove part provided in parallel to the first groove part and provided with a first notch part and a second notch part separated from the first notch part, the sliding part further includes a second protrusion part protruding toward the side of the storage part and inserted into the second groove part, and the second protrusion part is determined to be positioned at the first position by being engaged with the first notch part, and is determined to be positioned at the second position by being engaged with the second notch part.

4. A fusion splicer comprising the reinforcing apparatus according to claim 1.

5. The fusion splicer according to claim 4, wherein a convex part protruding toward an upper portion is provided at a position opposite to an end part of the sliding part.

* * * * *